United States Patent

[11] 3,595,012

[72] Inventor Earl J. Beck, Jr.
  Ventura, Calif.
[21] Appl. No. 9,240
[22] Filed Feb. 6, 1970
[45] Patented July 27, 1971
[73] Assignee The United States of America as
  represented by the Secretary of the Navy

[54] SEA PRESSURE OPERATED POWER DEVICE
  3 Claims, 4 Drawing Figs.
[52] U.S. Cl. .................................................. 60/1,
  60/51
[51] Int. Cl. .................................................. F01k 27/00
[50] Field of Search .......................................... 60/1, 22,
  26.1, 38, 51

[56] References Cited
  UNITED STATES PATENTS
3,163,985  1/1965  Bouyoucos ..................  60/51
3,436,914  4/1969  Rosfelder ..................  60/51
3,504,648  4/1970  Kriedt ......................  60/51 X Primary Examiner—Martin P. Schwadron
Assistant Examiner—Allen M. Ostrager
Attorneys—Richard S. Sciascia, Q. Baxter Warner and Gayward N. Mann ABSTRACT: A power source for an underwater tool comprising a hollow cylinder filled with a hygroscopic gas. At sea level the gas is maintained at atmospheric pressure so that when lowered to deep ocean depths, high pressure sea water will operate a tool connected thereto and then pass into the cylinder through a small orifice. The hygroscopic gas absorbs the water and maintains a constant low back pressure in the cylinder so that the power available remains constant as the cylinder fills.

INVENTOR
EARL J. BECK JR.
BY
ATTORNEYS

SEA PRESSURE OPERATED POWER DEVICE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

This invention relates to intact power unit and more particularly to hydrostatic power units employed in aqueous environments.

2. Discussion of the Prior Art

The prior art illustrates numerous energy creating systems for deep water employment. Generally such systems involve the principle of a valve means coupled with a pressure construction arrangement wherein the hydrostatic pressure differential causes movement of a cooperating tool which may be utilized to perform work. For example, Rosfelder, U.S. Pat. No. 3,435,914, shows a variation of the hydrostatic principle of provide a short term energy device. Other patents mentioned in the Rosfelder patent show various specific devices involving the use of the aforementioned hydrostatic principle. Difficulty has been experienced in many of these devices because of insufficient control thereover. Thus, any energy created was either released too quickly to be of use or was expended too erratically for any practical application.

An electrical cable is another means of supplying energy in deep water. However, the length of the cable and the drag caused by the water current generates strength and positioning problems, particularly in deep water.

SUMMARY OF THE INVENTION

The present invention involves an improvement over the well known hydrostatic principle to the effect that a cylinder with a cooperating element positioned therein will be forced to respond to an external hydrostatic sea pressure which is always much greater than the pressure within the interior of the cylinder. Thus, useful work may be performed which can be practically employed in deep sea innovations. The improvement herein includes the incorporation of a hygroscopic gas within the cylinder and the provision of a small orifice in the cooperating element through which sea water is allowed to enter the hygroscopic gas filled cylinder.

In one concept involving a sea pressure-operated power tool, the cooperating element is a piston having a small orifice for allowing sea water to enter the gas-filled cylinder where the water is absorbed, thereby maintaining a low pressure within the cylinder. High-pressure sea water may be introduced to one side of the piston through a control valve and the work produced by the piston may be utilized by a rack and pinion arrangement.

In a constant back pressure power source concept, a turbine wheel may be interposed in a conduit communicating the outside sea environment with a gas-filled chamber. When a valve is opened in the conduit, sea water is permitted to turn the vaned turbine wheel and enter the chamber where the water is absorbed by the hygroscopic gas thereby maintaining a low-pressure environment within the chamber.

STATEMENT OF THE OBJECTS OF THE INVENTION

It is an object of the present invention to provide a power device for use in a deep sea environment.

It is another object to provide an undersea power source in which the power is evenly available.

Another object of is to provide an undersea power source which is reliable and easily controlled.

Still another object is to provide an undersea power source which is operated by the high pressure of the environmental sea water thereby obviating the use of batteries or the like.

Other objects, advantages and novel features of the invention will become apparent from the following detailed description of the invention when considered in conjunction with the accompanying drawings wherein:

DESCRIPTION OF THE PREFERRED EMBODIMENTS

Figure 1:
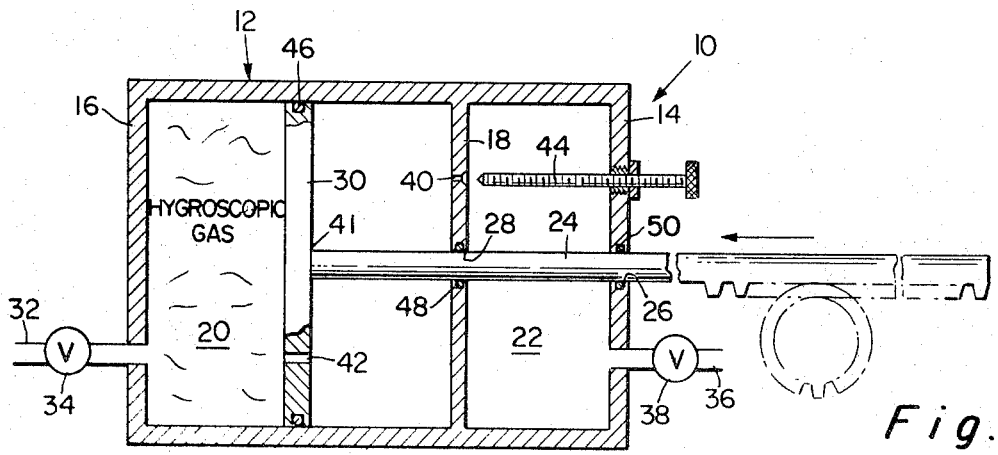
FIG. 1 is a diagrammatic sectional view of one embodiment of the invention.

Referring now to the drawings, there is shown in FIG. 1 a sea pressure-operated power tool 10 constructed of a hollow cylinder 12 having an upstream end 14 and a downstream end 16. A wall 18 divides the cylinder into a small upstream area 22 and a larger downstream area 20. A piston rod 24 extend into the cylinder through an opening 26 in upstream end 14 continuing through an aligned opening 28 in wall 18 and into downstream are a 20 where piston head 30 is attached thereto at 41. The piston head is designed to move along the length of the cylinder within the downstream area 20. It will be noted that a small orifice 42 is located in the piston head 30, the purpose of which will be conveniently described later in the specification.

A conduit 32 controlled by valve 34 opens the downstream area 20 to the exterior and provides a means through which a hygroscopic gas such as ammonia may be drawn into cylinder 12. The gas occupies specifically the area within the cylinder between downstream end 16 and piston head 30 and is maintained at substantially atmospheric pressure.

A second conduit 36 controlled by valve 38 provides a means by which environment sea water may be introduced into the upstream area 22 of cylinder 12. The orifice 40 in wall 18 permits the incoming sea water to pass through and strike the piston head 30. A needle valve 44 mounted in upstream end 14 and manually adjustable from the exterior provides precise control over the volume of water passing through the orifice 40.

Seal 46 is positioned about the piston head 30 and seal 48 positioned in wall 18 adjacent piston rod 24 as well as seal 50 locate in upstream end 14 also adjacent piston rod 24 are all adapted to render the cylinder 12 leakproof and provide pressure integrity necessary to maintain the hygroscopic gas at a relatively low pressure within the cylinder.

Thus in operation, the incoming sea water will be channeled by conduit 36 into the up stream area 22 of cylinder 12 and through orifice 40 in wall 18 after which the water strikes the piston head 30. Because the pressure of the ea water on one side of the piston head is much greater than the one atmosphere pressure of the hygroscopic gas on the opposite side, piston head 30 and attached rod 24 are moved in a downstream direction. Simultaneously, however, water passes through the small orifice 42 in the piston head 30 and is absorbed by the water-absorbing gas positioned therein. The work produced by the moving piston rod 24 may be utilized by a rack and pinion arrangement shown in outline form in FIG. 1. Other mechanical arrangements may also be employed if so desired.

Figure 2:
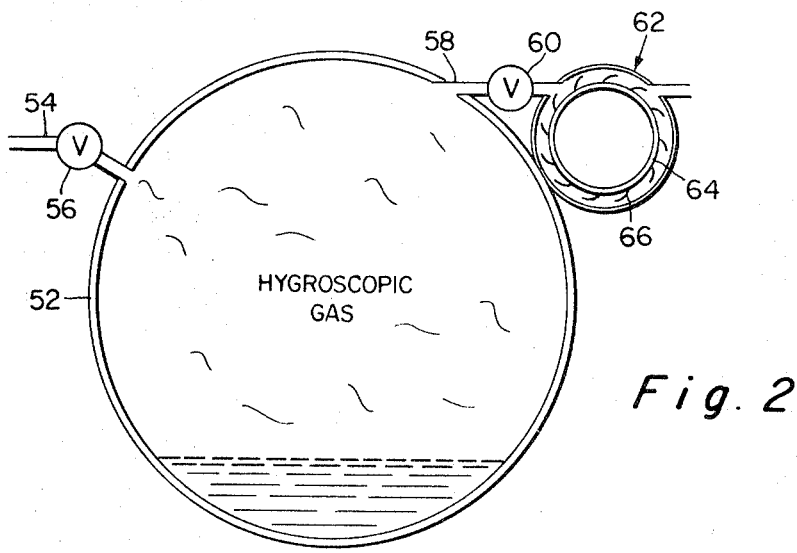
FIG. 2 is a diagrammatic sectional view of another embodiment of the invention.

In another embodiment involving the concept of a constant back pressure power source, there is shown in FIG. 2 a hollow sphere 52 designed to withstand the pressure of a deep ocean environment. A fitting 54 having the control valve 56 is mounted on the sphere and provides a means of either filling the sphere with a hygroscopic gas or of evacuation thereof.

A conduit 48 is also connected to sphere 52 which may be controlled by valve 60. A power device 62 may be attached in-line to conduit 58 which may be employed to operate other needed deep sea equipment.

In operation, valve 60 is opened permittng water to flow into the power device 62 which in FIG. 2 is shown to be a turbine wheel 64 with vanes 66. The incoming water rotates the wheel-performing work which may be employed for a multitude of useful purposes. The water which operates the turbine will continue through conduit 58 into the sphere and is absorbed by the hygroscopic gas therein, thus maintaining a low-pressure environment within the sphere. In this and the previous embodiment, as soon as the hygroscopic gas has absorbed as much water as is feasible, the cylinder 12 or sphere 52 may be disconnected and new units reconnected.

Figure 4:
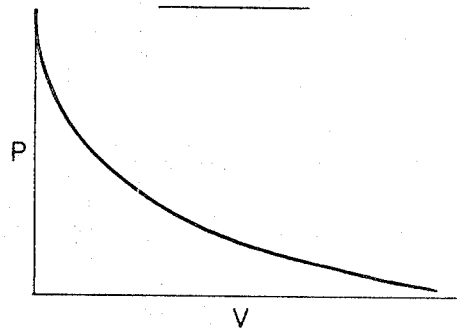
FIGS. 3 and 4 are diagrams showing the even power area in the present device in contrast to devices of the prior art.
Figure 3:
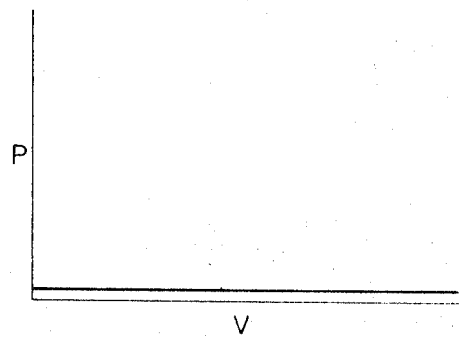

FIGS. 3 and 4 are comparative diagrams illustrating the even power available when using a hygroscopic gas-filled device shown in FIG. 3 in contrast to an air-filled device shown in FIG. 4. It will be noted that an air-filled device suffers from considerable lost power which is not the case in the present invention.

Obviously many modifications and variations of the present invention are possible in the light of the above teachings. It is therefore to be understood that within the scope of the appended claims the invention may be practiced otherwise than as specifically described.

I claim:

1. A deep sea hydrostatic power device comprising:
   a chamber;
   a hygroscopic gas occupying said chamber at about atmospheric pressure;
   an element cooperative with said gas filled chamber and adapted to move in response to the differential in pressure between the high hydrostatic pressure of a deep sea water environment and the relatively low pressure of the hygroscopic gas within said chamber and,
   means permitting a controlled quantity of water to enter the gas-filled chamber, the water being absorbed by said hygroscopic gas thereby maintaining a constant low pressure within said chamber, 2. A deep sea hydrostatic power device as defined in claim 1 wherein:
   said element includes a movable piston which is adapted to separate the chamber into two portions, one of which contains the hygroscopic gas and the other adapted to receive environmental sea water, said piston having a small orifice therein for allowing a controlled flow of sea water to enter the gas-filled portion where absorption thereof occurs;
   means connected to the chamber for introducing high pressure sea water into one of said portions and against one side of said piston which moves in response to the differential in pressure between the high pressure sea water in one portion and the low pressure in the hygroscopic gas-filled portion and,
   means attached to said piston for utilizing the work produced by the movement thereof.

3. A deep sea hydrostatic power device as defined in claim 1 wherein:
   said chamber includes a hollow sphere with the hygroscopic gas-positioned therein;
   conduit means attached to said sphere and adapted to open said sphere to the external high-pressure sea water;
   means attached to said conduit means for performing work in response to the high-pressure flow of sea water passing through said conduit;
   said water entering the sphere being absorbed by the hygroscopic gas which maintains the low pressure within the sphere.